(12) United States Patent
Scholl et al.

(10) Patent No.: US 10,262,394 B2
(45) Date of Patent: *Apr. 16, 2019

(54) TRACKING OBJECTS IN BOWL-SHAPED IMAGING SYSTEMS

(71) Applicant: Intel Corporation, Santa Clara, CA (US)

(72) Inventors: Kay-Ulrich Scholl, Karlsbad (DE); Koba Natroshvili, Waldbronn (DE)

(73) Assignee: Intel Corporation, Santa Clara, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/257,308

(22) Filed: Sep. 6, 2016

(65) Prior Publication Data

US 2016/0371843 A1    Dec. 22, 2016

Related U.S. Application Data

(63) Continuation of application No. 14/490,369, filed on Sep. 18, 2014, now Pat. No. 9,437,001.

(51) Int. Cl.
*G06T 3/00* (2006.01)
*B60R 1/00* (2006.01)
(Continued)

(52) U.S. Cl.
CPC ............. *G06T 3/0018* (2013.01); *B60R 1/00* (2013.01); *G06T 3/0062* (2013.01); *G06T 7/536* (2017.01);
(Continued)

(58) Field of Classification Search
None
See application file for complete search history.

(56) References Cited

U.S. PATENT DOCUMENTS

2007/0085901 A1    4/2007    Yang et al.
2007/0229238 A1    10/2007   Boyles
(Continued)

FOREIGN PATENT DOCUMENTS

CN    102729911    10/2012
JP    2006-031313   2/2006
(Continued)

OTHER PUBLICATIONS

International Search Report for PCT/US2015/045652, dated Dec. 4, 2015, 3 pages.
(Continued)

*Primary Examiner* — Mussa A Shaawat
*Assistant Examiner* — Abdhesh K Jha
(74) *Attorney, Agent, or Firm* — Barnes & Thornburg LLP

(57) ABSTRACT

Technologies for determining a distance of an object from a vehicle include a computing device to identify an object captured in a fisheye image generated by a fisheye camera of the vehicle. The computing device projects a contour of the identified object on a selected virtual plane that is located outside the vehicle and selected from a predefined set of virtual planes based on a location of the identified object relative to the vehicle. The computing device identifies a bottom of the projected contour on the selected virtual plane and determines an intersection point of an imaginary line with a ground plane coincident with a plane on which the vehicle is positioned. The imaginary line passes through each of the identified bottom of the projected contour and the fisheye camera. The computing device determines a location of the identified object relative to the vehicle based on the determined intersection point and the identified bottom of the projected contour.

17 Claims, 10 Drawing Sheets

(51) Int. Cl.
   *H04N 5/232* (2006.01)
   *G06T 7/536* (2017.01)
   *G06K 9/00* (2006.01)

(52) U.S. Cl.
   CPC ...... *H04N 5/23238* (2013.01); *B60R 2300/10* (2013.01); *B60R 2300/30* (2013.01); *B60R 2300/303* (2013.01); *B60R 2300/80* (2013.01); *G06K 9/00805* (2013.01); *G06T 2207/30252* (2013.01)

(56) References Cited

U.S. PATENT DOCUMENTS

| | | |
|---|---|---|
| 2008/0049105 A1 | 2/2008 | Shimizu |
| 2008/0204557 A1 | 8/2008 | Kubota |
| 2011/0032357 A1 | 2/2011 | Kitaura et al. |
| 2012/0262580 A1 | 10/2012 | Huebner et al. |
| 2012/0287232 A1 | 11/2012 | Natroshvili |
| 2013/0021449 A1* | 1/2013 | Tani ............... G01B 11/002 348/47 |
| 2013/0033602 A1 | 2/2013 | Quast et al. |
| 2014/0169627 A1 | 6/2014 | Gupta |
| 2015/0178884 A1 | 6/2015 | Scholl et al. |

FOREIGN PATENT DOCUMENTS

| | | | |
|---|---|---|---|
| JP | 2011-254436 | 12/2011 | |
| KR | 101440847 | * 2/2013 | ........... G06T 19/006 |
| KR | 10-2014-0108368 | 9/2014 | |

OTHER PUBLICATIONS

Written opinion of the international searching authority for PCT/US2015/045652, dated Dec. 4, 2015, 7 pages.

Bay, Herbert, et al., "Speeded-Up Robust Features (SURF)" Sep. 10, 2008, 14 pages.

Scaramuzza, Davide, et al., "A Flexible Technique for Accurate Omnidirectional Camera Calibration and Structure from Motion," ICVS 2006, 8 pages.

Shimizu, Seiya, et al., "Wraparound View System for Motor Vehicles," Fujitsu Sci. Tech. J., vol. 46, No. 1, pp. 95-102, Jan. 2010, 8 pages.

Fleet, David J., et al., "Optical Flow Estimation," Appears in "Mathematical Models in Computer Vision: The Handbook," N. Paragios, Y. Chen, and O. Faugeras (editors), Chapter 15, 2005, pp. 239-258, 24 pages.

"Extended Kalman filter," http://en.wikipedia.org/wiki/Extended_Kalman_filter, printed Oct. 31, 2014, 8 pages.

Extended European Search Report for European Patent Application No. 15842249.3, dated Jul. 19, 2018 (9 pages).

Bastian Leibe et al: "Coupled Detection and Trajectory Estimation for Multi-Object Tracking", !CCV 2007. IEEE 11th International Conference on Computer Vision, 2007, IEEE, Oct. 1, 2007 (Oct. 1, 2007), pp. 1-8, XP031194425, ISBN: 978-1-4244-1630-1.

Bastian Leibe et al: "Dynamic 3D Scene Analysis from a Moving Vehicle", 2007 IEEE Conference on Computer Vision and Pattern Recognition, Jun. 1, 2007 (Jun. 1, 2007), pp. 1-8, XP055170062, DOI: 10.1109/CVPR.2007.383146 ISBN: 978-1-42-441180-1.

Leibe Bet Al: "Pedestrian Detection in Crowded Scenes", Proceedings/ 2005 IEEE Computer Society Conference on Computer Vision and Pattern Recognition, CVPR 2005. [Jun. 20-25, 2005, San Diego, CA], IEEE, Piscataway, NJ, USA, vol. I, Jun. 20, 2005 (Jun. 20, 2005), pp. 878-885, XP010817364, DOI: 10.1109/CVPR.2005.272 ISBN: 978-0-7695-2372-9.

Hughes C et al: "Wide-angle camera technology for automotive applications: a review", IET Intelligent Transport Sys,, vol. 3, No. I, Mar. 9, 2009 (Mar. 9, 2009), pp. 19-31, XP006032372, ISSN: 1751-9578, DOI: 10.1049/IET-ITS:2008001.

Notice of Reason(s) of Rejection in Japanese Patent Application No. 2017-515141, including English translation, dated Apr. 24, 2018 (19 pages).

* cited by examiner

TRACKING OBJECTS IN BOWL-SHAPED IMAGING SYSTEMS

CROSS-REFERENCE TO RELATED APPLICATION

The present application is a continuation application of U.S. application Ser. No. 14/490,369, entitled "TRACKING OBJECTS IN BOWL-SHAPED IMAGING SYSTEMS," which was filed on Sep. 18, 2014.

BACKGROUND

Vehicle-mounted camera systems such as rearview cameras have become mainstays in luxury vehicles and even some lower-end vehicles. Depending on the particular implementation, a vehicle camera system may be used for improved vision, automated parallel parking, and/or other purposes. For example, images captured by vehicle-mounted cameras may be displayed on a navigation system display screen of the vehicle providing the driver with an unobstructed backward view (i.e., better than the rearview mirror) or overhead view of the vehicle (i.e. showing the vehicle's surroundings). In some vehicle-mounted camera systems, several cameras may be mounted to a vehicle to capture all of the surroundings of the vehicle (i.e., the full 360 degrees). Such vehicle-mounted camera systems may utilize wide-angle cameras such as those having fisheye lenses (i.e., fisheye cameras) in order to minimize the number of cameras necessary to capture the vehicle surroundings.

In certain circumstances, it may be beneficial for vehicle-based safety mechanisms to determine the distance of a particular object to a vehicle. For example, vehicle backup sensors may be utilized by an in-vehicle computing system to alert the driver when an object is within a threshold distance or to stop the vehicle automatically. Various techniques and mechanisms exist to determine the distance of objects to a particular reference point such as a vehicle. For example, in-vehicle computing systems may utilize radar, photonic mixer devices (PMDs), stereo cameras, proximity/motion sensors, and/or other sensors to determine the distance of an object from the vehicle.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
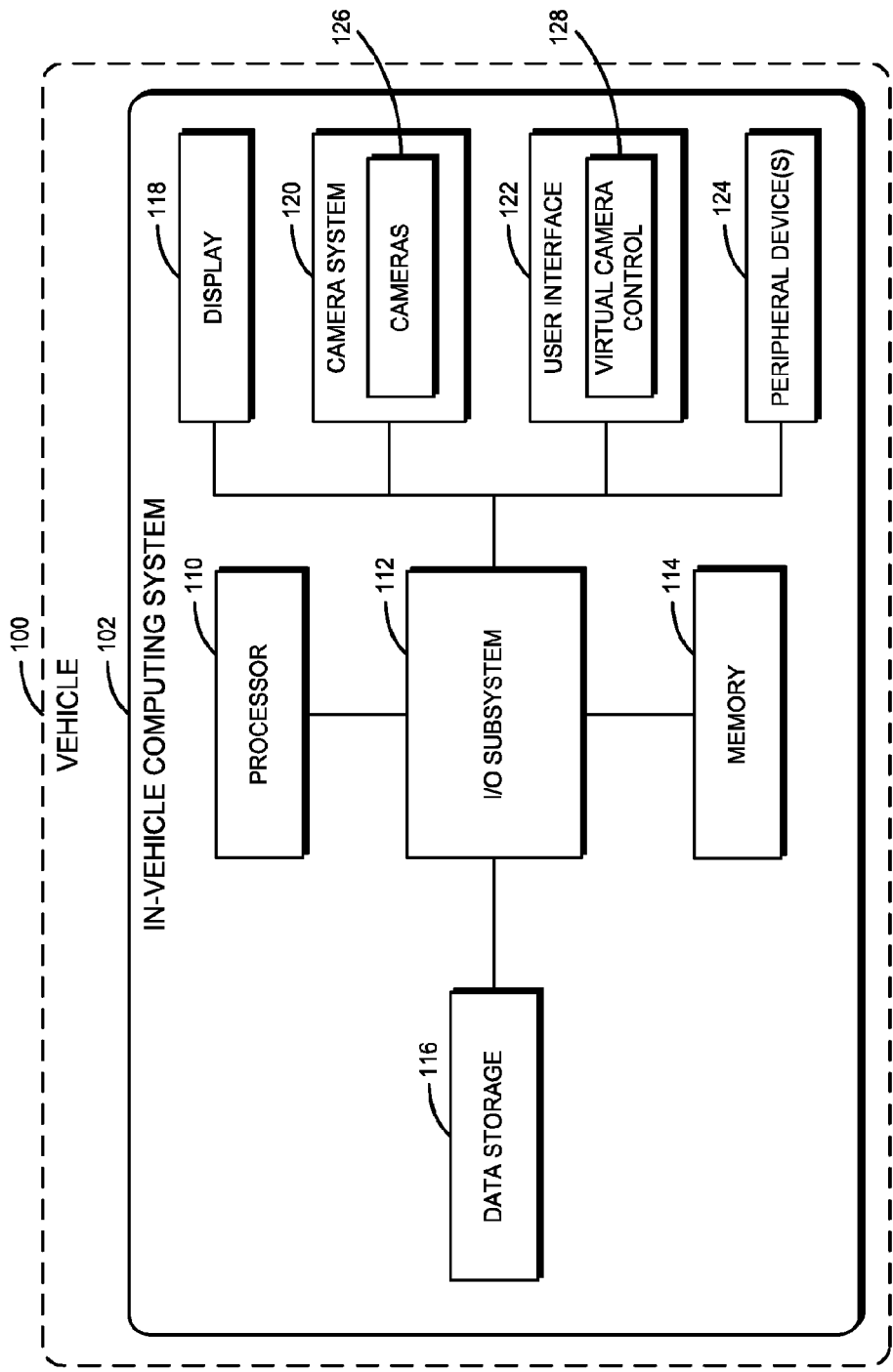
FIG. 1 is a simplified block diagram of at least one embodiment of an in-vehicle computing system of a vehicle for displaying a physical environment surrounding the vehicle and determining the distance of an object from the vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a vehicle 100 includes an in-vehicle computing system 102, which may be embodied as any type of computing system capable of performing the functions described herein. In the illustrative embodiment, the vehicle 100 is embodied as a wheeled passenger vehicle (e.g., a car, truck, truck-tractor, bus, etc.). However, it should be appreciated that, in other embodiments, the vehicle 100 may be embodied as another type of vehicle (e.g., as a rail-driven trolley, an unmanned vehicle, or another vehicle suited for application of the described techniques and mechanisms) or other moveable apparatus. As described herein, the in-vehicle computing system 102 is configured to capture fisheye images and project the fisheye images onto a virtual bowl-shaped projection surface to create a corresponding bowl-shaped image for the driver to view.

Figure 8:
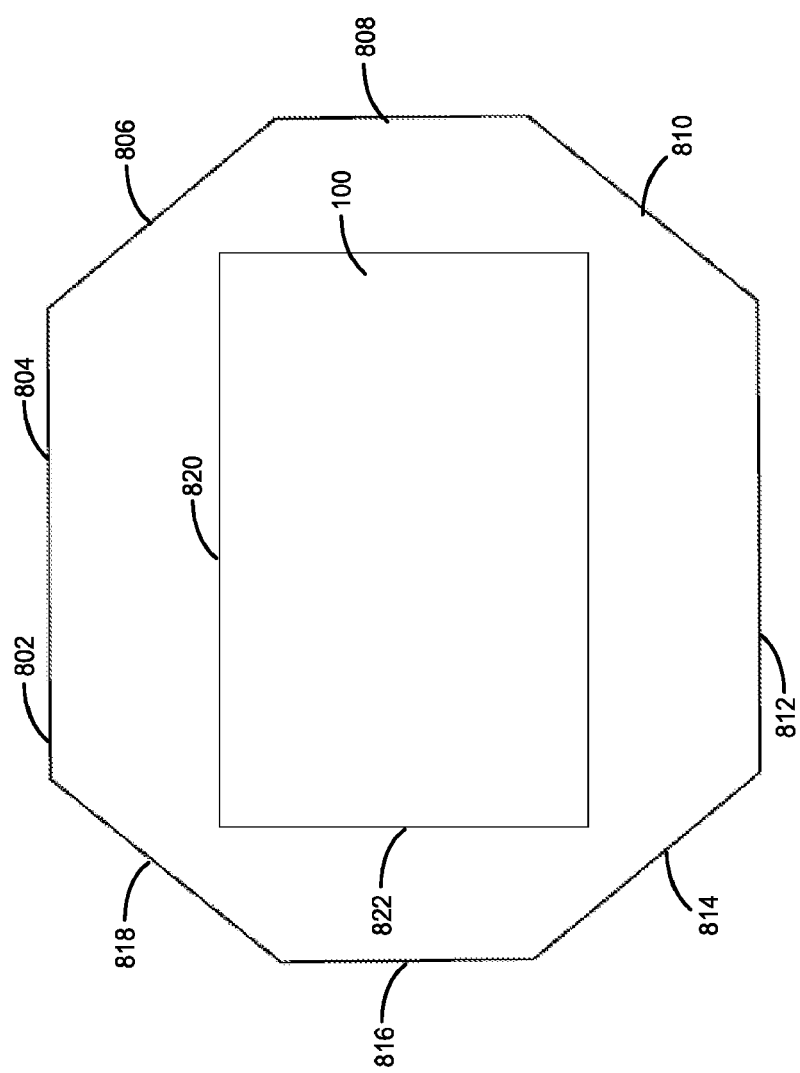
FIG. 8 is a simplified illustration of an arrangement of virtual planes surrounding the vehicle of FIG. 2.

Additionally, the in-vehicle computing system 102 identifies an object in the vicinity surrounding the vehicle 100 and determines the distance and/or location of that object relative to the vehicle 100. In particular, in the illustrative embodiment, the in-vehicle computing system 102 projects a contour of the identified object to a particular virtual plane (see FIGS. 8-9). The in-vehicle computing system 102 further identifies a bottom of the projected contour on the virtual plane (e.g., the bottom middle point of a box bounding the contour) and determines an intersection point of an imaginary line (i.e., the line passing through the bottom of the projected contour and the fisheye camera that captured the corresponding fisheye image) with the ground plane. As such, it should be appreciated that the in-vehicle computing system 102 assumes the object (e.g., a pedestrian) is standing on or otherwise positioned on the ground in the illustrative embodiment. As discussed in more detail below, the in-vehicle computing system 102 determines the location of the identified object relative to the vehicle 100 based on the determined intersection point and the bottom of the projected contour (e.g., by applying a Kalman filter based on those parameters). As such, it should be appreciated that the in-vehicle computing system 102 determines the distance and relative location of an object from the vehicle 100 without using radar, photonic mixer devices (PMDs), stereo cameras, proximity/motion sensors, and/or other sensors traditionally used to determine object distances. Rather, the in-vehicle computing system 102 uses the surrounding vehicle monitoring system described herein.

In some embodiments, the in-vehicle computing system 102 may be embodied as, or form a portion of, an in-vehicle infotainment system, a navigation system, and/or other vehicle-based computing system. In other embodiments, the in-vehicle computing system 102 may instead be embodied as a standalone computing device or computing system. Further, in some embodiments, a remote computing device may be communicatively coupled with the in-vehicle computing system 102 and configured to perform one or more of the functions described herein (e.g., remotely) and communicate the results to the in-vehicle computing system 102 via a network (e.g., a wired or wireless communication network). In such embodiments, the remote computing device may be embodied as any type of computing device capable of communicating with the in-vehicle computing system 102 and performing the functions described herein (e.g., a server, desktop computer, laptop computer, tablet computer, notebook, netbook, Ultrabook™, cellular phone, smartphone, personal digital assistant, mobile Internet device, wearable computing device, Hybrid device, and/or any other computing/communication device).

As shown in FIG. 1, the illustrative in-vehicle computing system 102 includes a processor 110, an input/output ("I/O") subsystem 112, a memory 114, a data storage 116, a display 118, a camera system 120, a user interface 122, and, in some embodiments, one or more peripheral devices 124. Additionally, the camera system 120 includes one or more cameras 126 and the user interface 122 includes a virtual camera control 128. Of course, the in-vehicle computing system 102 may include other or additional components, such as those commonly found in a typical computing device (e.g., communication circuitry, various input/output devices, and/or other components), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the in-vehicle computing system 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the in-vehicle computing system 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the in-vehicle computing system 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the in-vehicle computing system 102 such as, for example, captured and processed images, component parameters (e.g., intrinsic parameters of the cameras 126), data regarding the geometry of the camera system 120, and/or other data useful in the operation of the in-vehicle computing system 102 as discussed below.

The display 118 of the in-vehicle computing system 102 may be embodied as any one or more display screens on which information may be displayed to a user of the in-vehicle computing system 102 (e.g., a driver or passenger of the vehicle 100). The display 118 may be embodied as, or otherwise use, any suitable display technology including, for example, a liquid crystal display (LCD), a light emitting diode (LED) display, a cathode ray tube (CRT) display, a plasma display, a holographic or other three-dimensional (3D) display, and/or other display technology. Although only a single display 118 is illustrated in FIG. 1, it should be appreciated that the in-vehicle computing system 102 may include multiple displays or display screens on which the same or different content may be displayed contemporaneously or sequentially with each other. The display 118 may be embodied as a general purpose display on which various vehicle operating parameters and/or vehicle infotainment information (e.g., radio station, temperature controls, etc.) are displayed. Alternatively, the display 118 may be embodied as a specific purpose display for displaying images generated by the camera system 120 as discussed below.

The camera system 120 includes one or more cameras 126, which may be used to capture images of a surrounding environment of the vehicle 100 or, more particularly, a surrounding environment of the in-vehicle computing system 102. It should be appreciated that, in the illustrative embodiment, the cameras 126 of the camera system 120 are suitably spaced to capture the full 360-degree surroundings of the vehicle 100 or a substantial portion thereof. Additionally, in some embodiments, the geometry associated with the positioning of the cameras 126 relative to one another and/or relative to the vehicle 100 is known or able to be determined.

Figure 2:
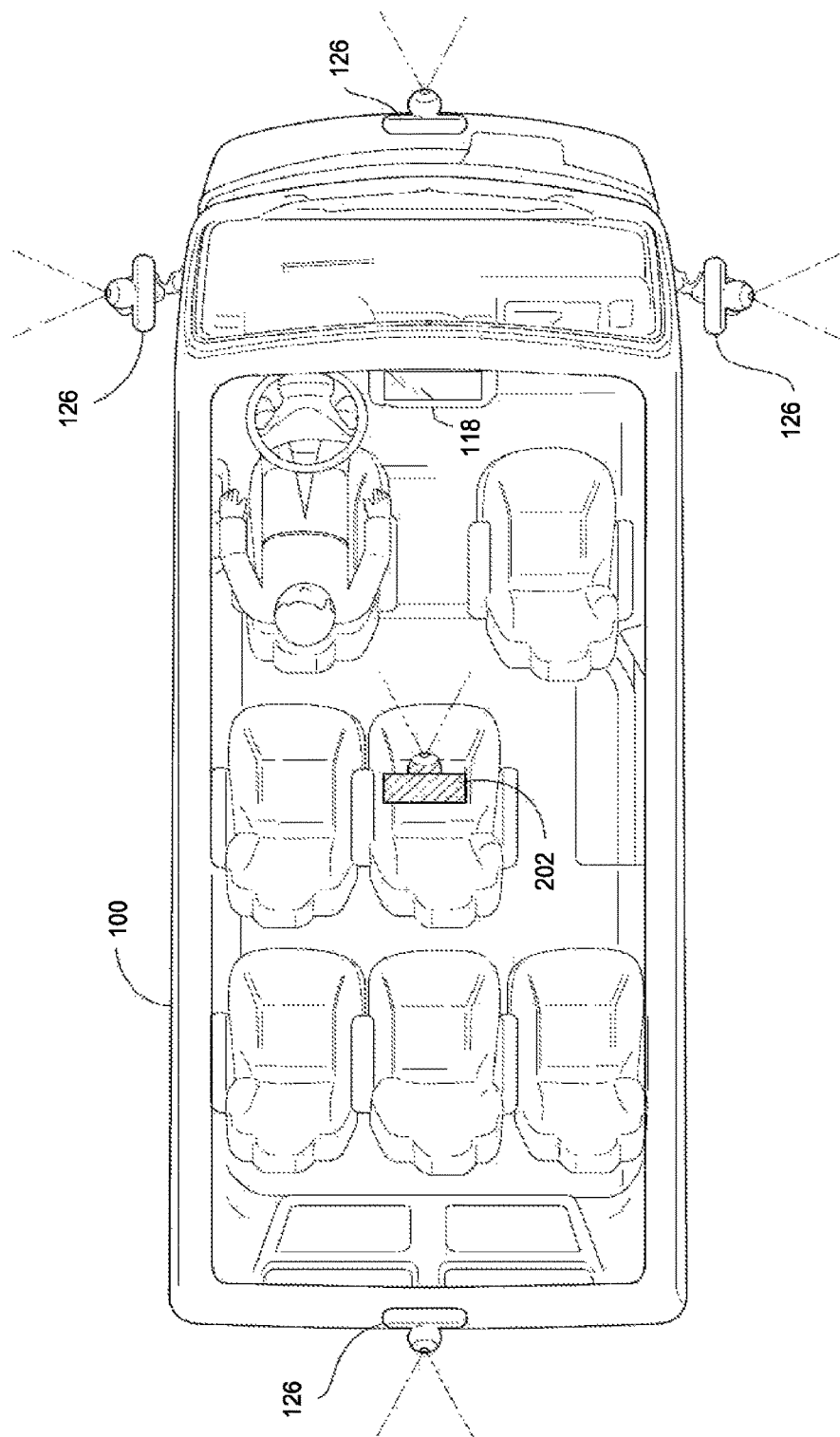
FIG. 2 is a simplified illustration of at least one embodiment of the vehicle of FIG. 1.

Each of the cameras 126 may be embodied as any peripheral or integrated device suitable for capturing images, such as a still camera, a video camera, a webcam, or other device capable of capturing video and/or images. In the illustrative embodiment, each of the cameras 126 is embodied as a fisheye camera to facilitate capture of the complete, or near complete, surroundings of the vehicle 100. Of course, in other embodiments, other types of wide or narrow angled cameras may be used depending on, for example, the type of vehicle 100, the type of cameras 126 used, the number of cameras 126 used, and/or other criteria. Additionally, the camera system 120 may include two or more cameras 126 to capture the surroundings of the vehicle 100 depending on such various criteria. In the illustrative embodiment, the camera system 120 includes four fisheye cameras 126 (i.e., cameras 126 having fisheye lenses) mounted to, or integrated with, the vehicle 100 to capture the full surroundings of the vehicle 100 while minimizing the number of cameras 126 necessary to do so. For example, as shown in the illustrative embodiment of FIG. 2, a camera 126 may be mounted to each of the four sides of the vehicle 100 (i.e., the front, rear, driver's side, and passenger's side). Of course, in other embodiments, the in-vehicle computing system 102 may utilize a different number, type, and/or relative positioning of the cameras 126. For example, in another embodiment, the cameras 126 may be positioned in other locations about the vehicle 100 (e.g., at the corners of the vehicle 100). Depending on the particular embodiment, the cameras 126 of the camera system 120 may be of the same type or of different types. For example, in some embodiments, one or more of the cameras 126 of the camera system 120 may have fisheye lenses and one or more of the cameras 126 may have traditional lenses.

The user interface 122 permits a user of the in-vehicle computing system 102 to interact with the in-vehicle computing system 102. For example, as discussed below, the user may interact with the in-vehicle computing system 102 to display the surroundings of the vehicle 100 on the display 118. As such, in some embodiments, the user interface 122 includes one or more virtual and/or physical buttons, knobs, switches, keypads, touchscreens, and/or other mechanisms to permit I/O functionality. For example, in some embodiments, the user interface 122 may be integrated with a navigation or infotainment system of the vehicle 100. As discussed above, the user interface 122 includes a virtual camera control 128 in the illustrative embodiment. The virtual camera control 128 permits a user of the in-vehicle computing system 102 to modify the field of view of a virtual camera 202 (see FIG. 2) of the in-vehicle computing system 102 (e.g., by "moving" the virtual camera). As discussed in detail below, the virtual camera 202 "captures" the image to be rendered on the display 118, which may correspond with a single image captured by one of the cameras 126 or a combination of images captured by multiple cameras 126 (e.g., adjacent cameras 126). Accordingly, by rotating or otherwise moving the virtual camera 202 and thereby changing the field of view of the virtual camera 202, the displayed image may be adjusted by the user of the in-vehicle computing system 102. As discussed in further detail below, a bowl-shaped image is generated based on images of the surroundings of the vehicle 100 captured by the cameras 126 and processed by the in-vehicle computing system 102. As such, in some embodiments, the bowl-shaped image may be rendered on the display 118 based on the field of view of the virtual camera 202, which may include a combination of field of views from multiple cameras 126. For example, the bowl-shaped image may be displayed based on a perspective from which the bowl-shaped image is "captured" by the virtual camera 202 (e.g., from the top/bottom, from far/near, from inside/outside the bowl-shaped image, etc.).

In some embodiments, the in-vehicle computing system 102 may also include one or more peripheral devices 124. The peripheral devices 124 may include any number of additional peripheral or interface devices, such as speakers, microphones, additional storage devices, and so forth. The particular devices included in the peripheral devices 124 may depend on, for example, the type and/or intended use of the in-vehicle computing system 102 (e.g., whether the in-vehicle computing system 102 is a stand-alone system or incorporated into a larger in-vehicle infotainment system). It should be appreciated that, depending on the particular embodiment, one or more components of the in-vehicle computing system 102 may be omitted (e.g., the virtual camera control 128 and/or the peripheral devices 124).

Figure 3:
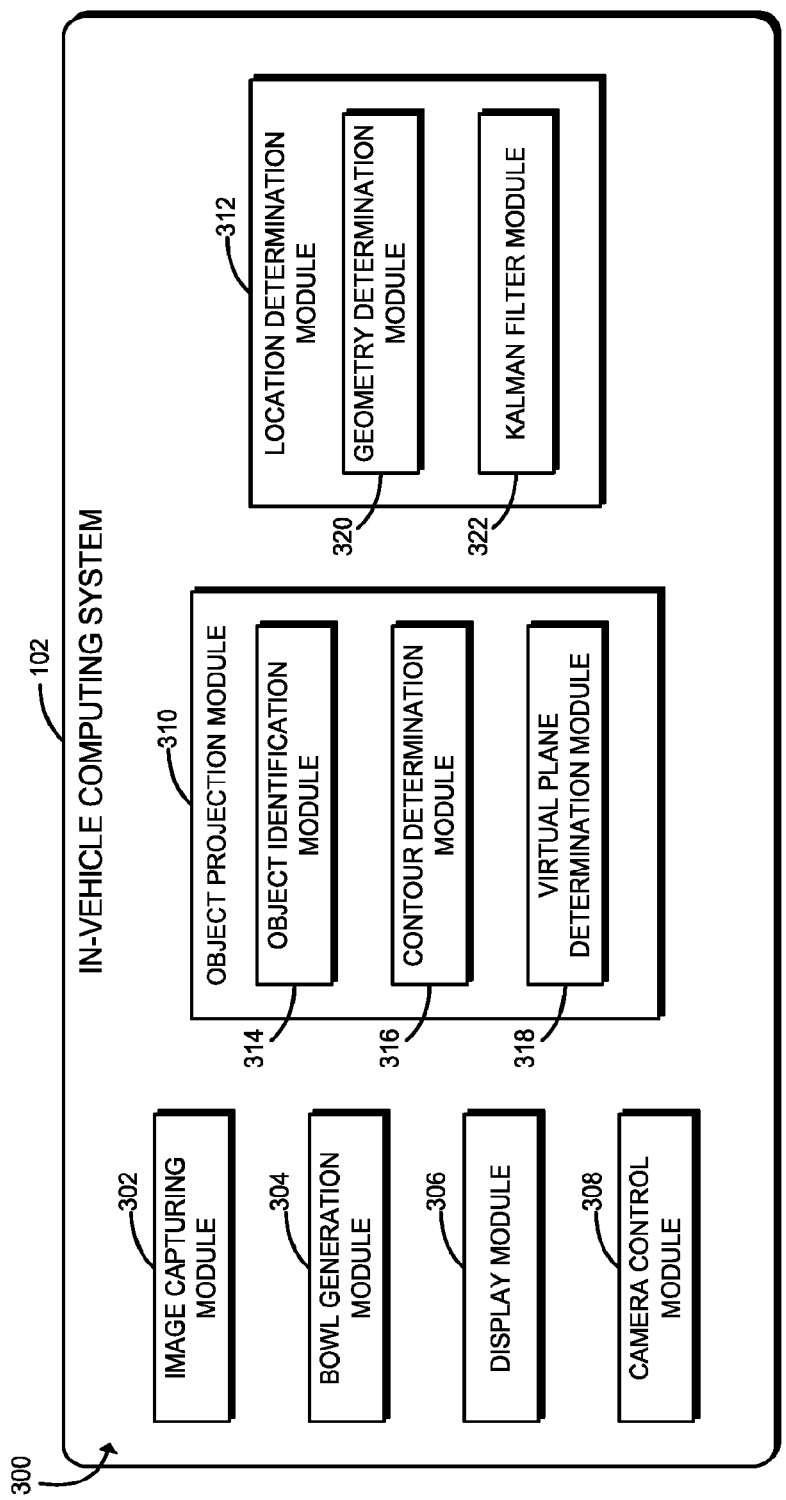
FIG. 3 is a simplified block diagram of at least one embodiment of an environment established by the in-vehicle computing system of FIG. 1.

Referring now to FIG. 3, in use, the in-vehicle computing system 102 establishes an environment 300 for displaying a physical environment surrounding the vehicle 100 and determining the distance of an object from the vehicle 100. As indicated above and described in greater detail below, the in-vehicle computing system 102 determines the distance of an object from the vehicle 100 without using external sensors. Instead, the in-vehicle computing system 102 projects the contour of the object to a virtual plane and applies a Kalman filter based on the bottom of the projected contour in the virtual plane to determine the location of the object.

The illustrative environment 300 of the in-vehicle computing system 102 includes an image capturing module 302, a bowl generation module 304, a display module 306, a camera control module 308, an object projection module 310, and a location determination module 312. Additionally, the object projection module 310 includes an object identification module 314, a contour determination module 316, and a virtual plane determination module 318. The illustrative location determination module 312 includes a geometry determination module 320 and a Kalman filter module 322. Each of the modules of the environment 300 may be embodied as hardware, software, firmware, or a combination thereof. For example, each of the modules, logic, and other components of the environment 300 may form a portion of, or otherwise be established or executed by, the processor 110 or other hardware component(s) of the in-vehicle computing system 102. Additionally, in some embodiments, one or more of the illustrative modules may form a portion of another module and/or one or more of the illustrative modules may be embodied as a standalone or independent module. It should be appreciated that, in some embodiments, one or more of the techniques and/or modules described in International Patent Application Serial No. PCT/US2013/076644, filed Dec. 19, 2013, may be utilized by the in-vehicle computing system 102 and/or included in the environment 300 described herein. Similarly, the techniques and/or modules described herein may be utilized in some embodiments of the in-vehicle computing system described in International Patent Application Serial No. PCT/US2013/076644.

The image capturing module 302 controls the cameras 126 of the camera system 120 to capture images/video of scenes within the field of view of each of the cameras 126. Depending on the particular embodiment, the image capturing module 302 may instruct each camera 126 to capture images continuously (e.g., as a video stream), periodically, in response to temporal or conditional inputs, as a combination thereof, or based on another scheme. For example, the cameras 126 may capture images when the transmission of the vehicle 100 is in reverse mode and/or when the vehicle 100 is moving below a certain threshold speed.

Figure 4:
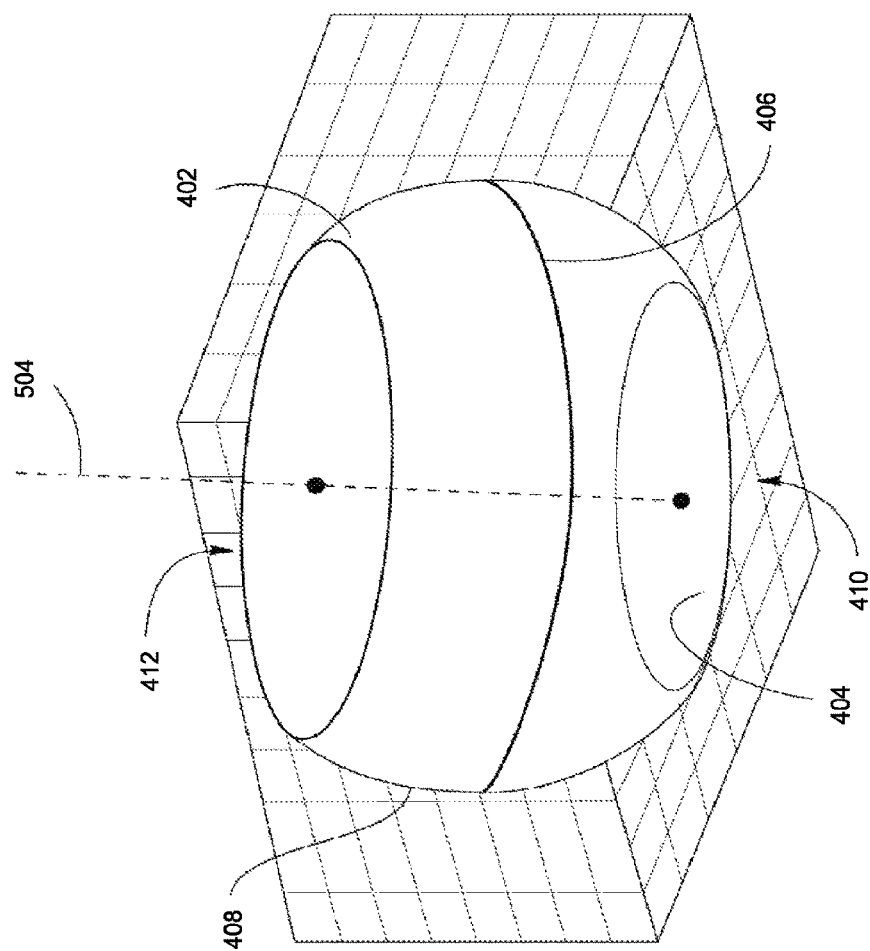
FIG. 4 is a simplified illustration of at least one embodiment of a virtual bowl-shaped projection surface.

The bowl generation module 304 generates a virtual bowl-shaped projection surface 402 (see FIG. 4) on which images captured by the cameras 126 of the camera system 120, or processed versions thereof (e.g., combined images), may be projected for viewing by the user of the in-vehicle computing system 102 (e.g., the driver of the vehicle 100). In most in-vehicle imaging systems, visualizations of images captured by vehicle-mounted cameras result in significant distortion of those objects that are not located on a ground plane 404 (see FIG. 4) upon which the vehicle rests. In the illustrative embodiment, the virtual bowl-shaped projection surface 402 has specifically defined geometric characteristics such as, for example, a smoothness of the virtual bowl-shaped projection surface 402, a smooth transition between the virtual bowl-shaped projection surface 402 and the ground plane 404, and flatness of the bowl-shaped projection surface 402 at the ground plane 404. In the illustrative embodiment, the bowl generation module 304 determines the desired geometry of the virtual bowl-shaped projection surface 402 based on various parameters related to the size of the vehicle 100 (e.g., length, width, height, etc.) and/or other features (e.g., bowl height, horizontal offset, adaptive ratios, etc.) and constructs the virtual bowl-shaped projection surface 402 (e.g., by constructing each horizontal slice 406 of the virtual bowl-shaped projection surface 402). Each horizontal slice may have a width dependent on the particular embodiment (e.g., non-uniform widths) in some embodiments.

It should be appreciated that, in the illustrative embodiment, the virtual bowl-shaped projection surface 402 is shaped such that the vehicle 100, or a virtual representation thereof, is positioned inside the bowl-shaped projection surface 402 on the ground plane 404. As described in detail below, based on that information, the bowl generation module 304 determines the major and minor semi-axes of a vertical slice 408 (see FIG. 4) of the bowl-shaped projection surface 402 along the length of the vehicle 100. Additionally, the bowl generation module 304 determines, for each horizontal slice of the virtual bowl-shaped projection surface 402 (e.g., from bottom 410 to top 412), the major semi-axis of the corresponding horizontal slice based on the major and minor semi-axes of the vertical slice 408 and the minor semi-axis of the corresponding horizontal slice based on an adaptive ratio between the major and minor semi-axes of the corresponding horizontal slice. As described below, in the illustrative embodiment, the adaptive ratio changes linearly and is approximately unity (i.e., 1.0) at the top 412 of the bowl-shaped projection surface 402 and equal to the length of the vehicle 100 divided by the width of the vehicle 100

$$\left(\text{i.e., } \frac{carLength}{carWidth}\right)$$

at the bottom 410 of the bowl-shaped projection surface 402. Accordingly, the top-most horizontal slice of the bowl-shaped projection surface 402 has a circular geometry shape and the bottom-most horizontal slice has a non-circular elliptical geometric shape (i.e., the bottom-most horizontal slice defines an ellipse for which its major axis does not equal its minor axis) The largest horizontal slice of the bowl-shaped projection surface 402 is toward the vertical middle of the surface 402.

The bowl generation module 304 further combines horizontal slices to generate the virtual bowl-shaped projection surface 402. For example, the bowl generation module 304 may stack the horizontal slices of the bowl-shaped projection surface 402 and merge those slices together to form the resultant bowl-shaped projection surface 402. Additionally, the bowl generation module 304 may generate and merge a bottom 410 of the bowl, which is a flat ground plane 404 (or partial-plane, more specifically). It should be appreciated that the top 412 of the bowl-shaped projection surface 402 is partially open and portions of the environment above the vehicle 100 may be projected on a top portion of the bowl-shaped projection surface 402. In the illustrative embodiment, a section of the generated virtual bowl-shaped projection surface 402 adjacent the ground plane 404 is filtered or otherwise smoothed. That is, a bottom portion of the bowl-shaped projection surface 402 approaches the bottom 410 of the bowl-shaped projection surface 402 (i.e., the ground plane 404) at a slower rate than a top portion of the bowl-shaped projection surface 402 approaches the top 412 of the bowl-shaped projection surface 402.

It should be appreciated that, in the illustrative embodiment, an image projected onto the bowl-shaped projection surface 402 (referred to herein as "a bowl-shaped image") will include those features described above with regard to the bowl-shaped projection surface 402 (i.e., the bowl-shaped image will include a bottom portion having a derivative with an absolute value that is less than the absolute value of the derivative of the top portion. Further, the bottom portion of the bowl-shaped projection surface 402 merges with the ground plane 404 of the bowl-shaped projection surface 402 such that the derivative of the surface at any place is definite (i.e., there exist no singularities). It should be appreciated that the bowl generation module 304 may use any suitable image filters, algorithms, techniques, and/or mechanisms to generate the virtual bowl-shaped projection surface and bowl-shaped images. Of course, in some embodiments, the bowl generation module 304 may generate a virtual bowl-shaped projection surface having features different from the virtual bowl-shaped projection surface 402 of FIG. 4 described herein.

The display module 306 renders images on the display 118 for a user of the in-vehicle computing system 102 to view. For example, the display module 306 may "project" one or more fisheye images, processed images, and/or other types of images onto the virtual bowl-shaped projection surface 402 generated by the bowl generation module 304 to create a bowl-shaped image and display the bowl-shaped image, or a portion thereof, on the display 118. Of course, it should be appreciated that, in some embodiments, the generated images or combined images are not "projected" onto the bowl-shaped projection surface 402 in the traditional sense; rather, the generated images may be modified to have a bowl shape, including the features discussed above, as if the image(s) were projected onto the bowl-shaped projection surface 402.

As indicated above, in some embodiments, the display module 306 may render only the portions of the bowl-shaped image within the field of view of a virtual camera 202 of the in-vehicle computing system 102. Accordingly, although the bowl-shaped image may be embodied as an image "projected" onto a three-dimensional surface, the display 118 may render a two-dimensional perspective of the bowl-shaped image in some embodiments. In the illustrative embodiment, the camera control module 308 determines the perspective of the virtual camera 202 and, in conjunction with the virtual camera control 128, permits a user of the in-vehicle computing system 102 to modify the field of view of the virtual camera 202 of the in-vehicle computing system 102.

The object projection module 310 is configured to project an identified object (e.g., its contour) onto a virtual plane selected from a plurality of virtual planes. As discussed above, in the illustrative embodiment, the object projection module 310 includes an object identification module 314, a contour determination module 316, and a virtual plane determination module 318.

The object identification module 314 identifies an object in the vicinity surrounding the vehicle 100. In particular, in the illustrative embodiment, the object identification module 314 identifies an object in a fisheye image captured by one of the fisheye cameras 126. It should be appreciated that the object identification module 314 may utilize any suitable techniques, algorithms, and/or mechanisms for doing so. For example, in some embodiments, the objects may be identified using one or more of the optical flow, segmentation, and/or classification techniques described in International Patent Application Serial No. PCT/US2013/076644, filed Dec. 19, 2013. In some embodiments, the in-vehicle computing system 102 only determines the distances of moving objects to the vehicle 100 and, therefore, the object identification module 314 identifies objects that are moving with respect to the vehicle 100 (e.g., pedestrians). As indicated above, in the illustrative embodiment, the in-vehicle computing system 102 assumes the object is positioned on the ground plane in determining the distance of the object from the vehicle 100. Accordingly, in some embodiments, the object identification module 314 may determine whether the identified object is actually positioned on the ground plane or approximately on the ground plane (e.g., prior to determining the distance of the object). Of course, although the techniques and algorithms are described herein in reference to determining the distance of a single object from the vehicle 100, in some embodiments, the in-vehicle computing system 102 may determine the distance of multiple objects and/or collections/sets of objects from the vehicle 100.

The contour determination module 316 determines the contour of the object identified in the captured fisheye image for projection to a virtual plane. It should be appreciated that the contour determination module 316 may determine the object's contour using any suitable techniques, algorithms, and/or mechanisms. For example, the contour determination module 316 may utilize an edge detection algorithm (e.g., Canny edge detection, Sobel filters, etc.), an image segmentation algorithm (e.g., watershed segmentation, pyramid segmentation, etc.), and/or other image filter/algorithms to determine the contour of the identified object. Of course, in some embodiments, the in-vehicle computing system 102 may determine the contour of the object by virtue of the identification of the object. That is, the techniques, algorithms, and/or mechanisms employed by the in-vehicle computing system 102 to identify an object in the fisheye image may contemporaneously determine the contour of the object (e.g., certain edge detection and segmentation algorithms).

Figure 9:
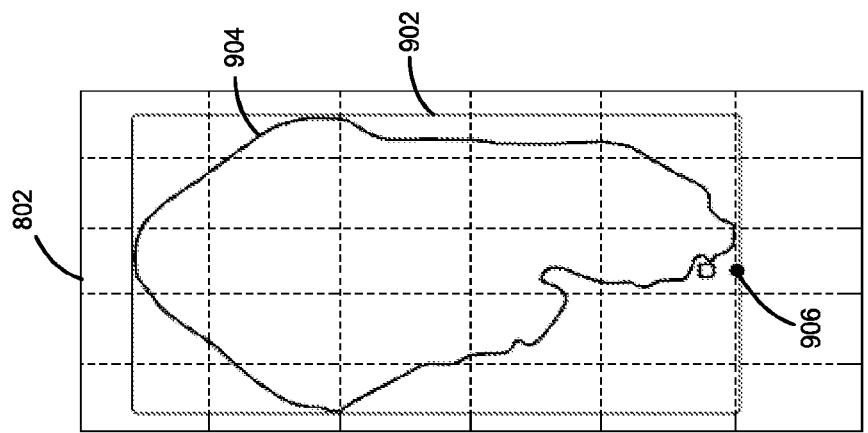
FIG. 9 is a simplified illustration of an identified object's contour projected onto one of the virtual planes of FIG. 8.

It should be appreciated that, in some implementations, a bounding box could be placed around the identified contour of the object in the fisheye image and utilized to estimate the distance of the object from the vehicle 100 and/or the dimensions of the object. However, the inclination angles of the cameras 126 and the fisheye distortion of the fisheye images may result in, for example, a bounding box much larger than the actual dimensions of the object. In other words, such implementations may provide inaccurate and/or unreliable results in some circumstances. Accordingly, in the illustrative embodiment, the object's contour is projected to a virtual plane to minimize or reduce those errors. In particular, the virtual plane determination module 318 selects a virtual plane 802 (see FIG. 8) from a plurality of virtual planes 802 to which to project the object's contour. As described in greater detail below, the virtual planes 802 may be configured in a specific arrangement and the particular virtual plane 802 selected for projection may be chosen based on, for example, the approximate location of the identified object and/or location of the fisheye camera 126 that captured the object. The object projection module 310 projects the object's contour onto the selected virtual plane as shown in FIG. 9.

The location determination module 312 determines the location of the object relative to the vehicle 100. As discussed above, in the illustrative embodiment, the location determination module 312 includes the geometry determination module 320 and the Kalman filter module 322. The geometry determination module 320 is configured to determine various geometric features and relationships such as, for example, geometric features of the object's projected contour and/or relationships of the projected contour to other components and/or virtual structures generated or determined by the in-vehicle computing system 102. The geometry determination module 320 determines a bottom of the object's contour projected to the selected virtual plane as shown in FIG. 9. In particular, in the illustrative embodiment, the geometry determination module 320 determines a bounding box 902 for the object's contour 904 projected to the virtual plane 802 and determines a bottom middle point 906 of the bounding box 902. Further, the geometry determination module 320 determines a line that passes through (i.e., intersects) both the bottom of the object's contour (e.g., the bottom middle point 906) and the fisheye camera 126 (e.g., the center of that camera 126) that captured the fisheye image from which the object's contour was projected. Additionally, the geometry determination module 320 determines the intersection point of that line with a ground plane (e.g., the plane including the ground plane 404).

The location determination module 312 determines the location of the object relative to the vehicle 100 based on the determined intersection point and the bottom of the object's contour (e.g., the bottom middle point 906 of the bounding box 902). In particular, in the illustrative embodiment, the Kalman filter module 322 applies a Kalman filter (e.g., an extended Kalman filter) to determine the location of the object relative to the vehicle 100 based on the intersection point and the bottom of the object's contour. It should be appreciated that a Kalman filter may be applied to estimate a state based on, for example, a defined state vector, a state transition matrix, and a measurement vector. As discussed in greater detail below with regard to FIG. 7, in the illustrative embodiment, the Kalman filter is applied using a state vector corresponding with the intersection point, a measurement vector corresponding with the bottom of the object's contour, and a state transition matrix corresponding with Brownian motion. For example, as described below, the in-vehicle computing system 102 determines (or retrieves) analytical equations defining the intersection point of the line through the ground plane described above and applies the Kalman filter recursively such that the state vector (e.g., the intersection point) is recursively estimated. A Jacobean is also utilized to handle the covariance due to the nonlinearity of the vector relationships.

Figure 5:
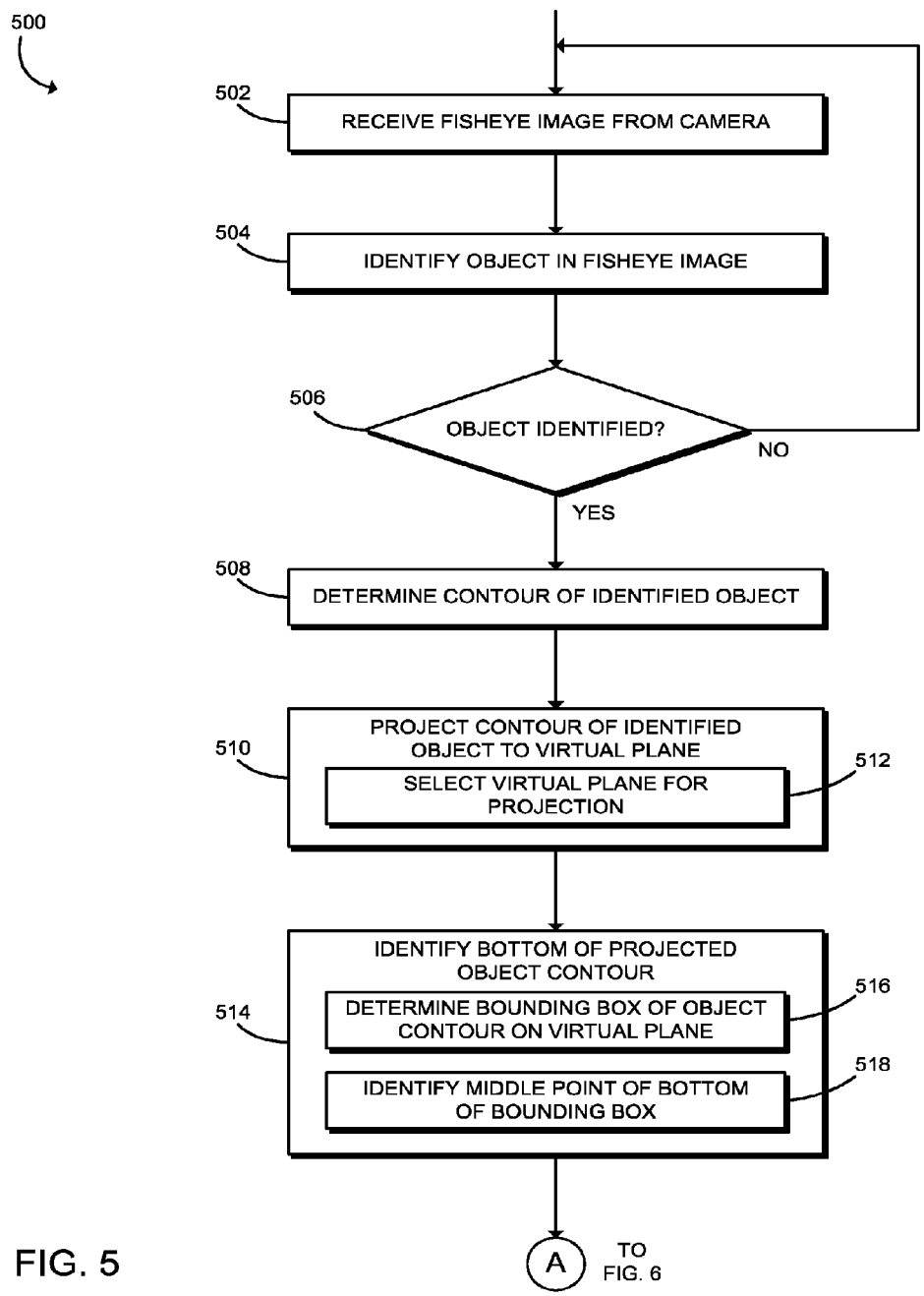
FIGS. 5-6 is a simplified flow diagram of at least one embodiment of a method for determining the distance of an object from the vehicle by the in-vehicle computing system of FIG. 1.
Figure 6:
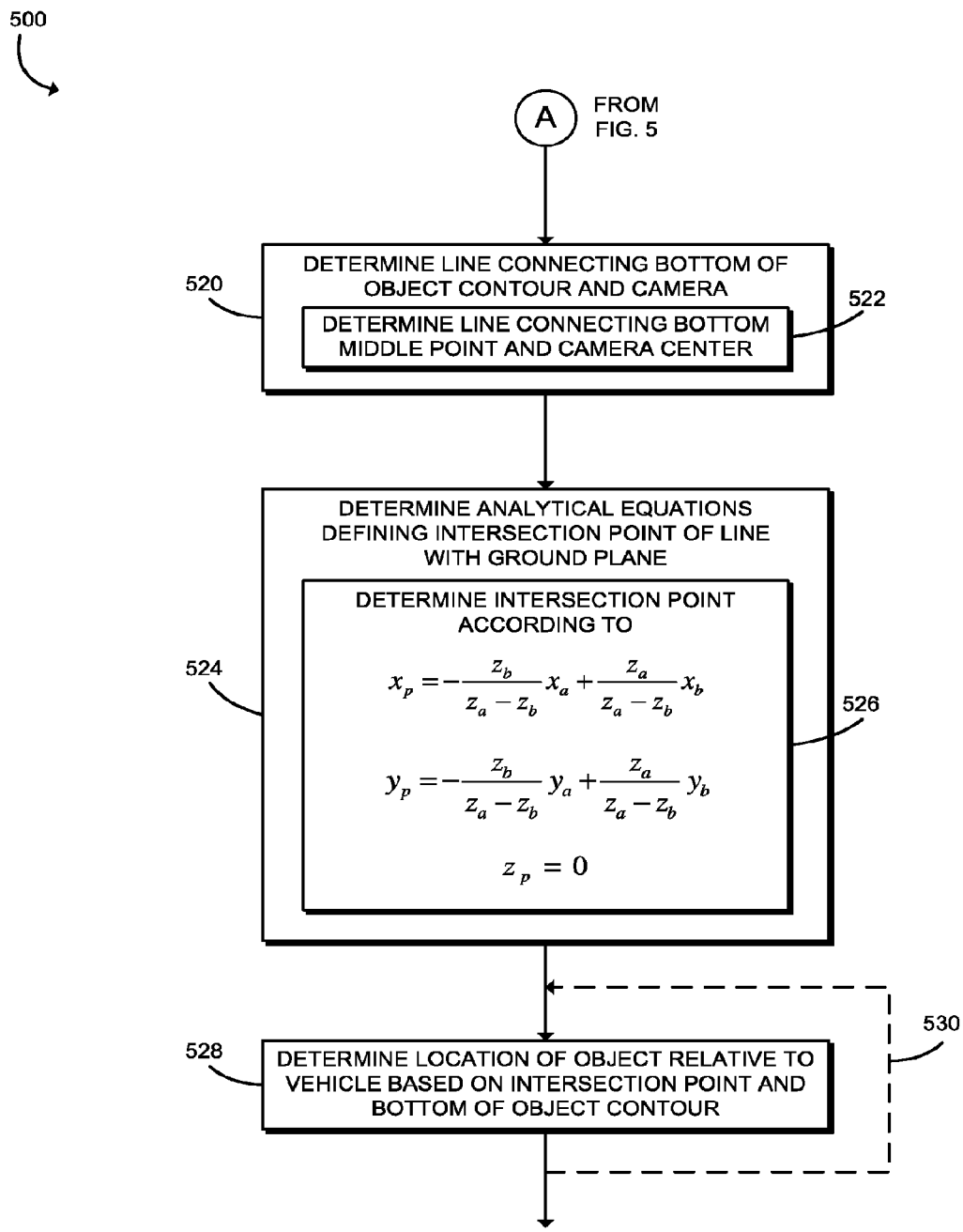

Referring now to FIGS. 5-6, in use, the in-vehicle computing system 10 may execute a method 500 for determining the distance of an object from the vehicle 100. As discussed above, the methods described herein are generally described with respect to fisheye cameras 126 and fisheye images generated by such cameras 126; however the methods are also applicable to other types of cameras 126 and/or images. The illustrative method 500 begins with block 502 of FIG. 5 in which the in-vehicle computing system 102 receives a fisheye image from one of the fisheye camera 126. As indicated above, in the illustrative embodiment, the vehicle 100 includes four fisheye cameras 126 strategically positioned to capture, for example, the entire 360 surroundings of the vehicle 100. Accordingly, the in-vehicle computing system 102 may select one of the captured fisheye images to determine whether there are any objects in the vicinity surrounding the vehicle 100 corresponding with the field of view of the fisheye camera 126 that captured the selected fisheye image and, if so, determine the distance of the identified object.

In block 504, the in-vehicle computing system 102 identifies an object in the received/selected fisheye image. As discussed above, the in-vehicle computing system 102 may utilize any suitable techniques, algorithms, and/or mechanisms for doing so. For example, in some embodiments, the in-vehicle computing system 102 may utilize edge detection, image segmentation, optical flow, object classification, and/or other techniques to identify an object in the fisheye image. In particular, in some embodiments, the in-vehicle computing system 102 may utilize one or more of the techniques described in International Patent Application Serial No. PCT/US2013/076644, filed Dec. 19, 2013. As indicated above, in some embodiments, the in-vehicle computing system 102 determines whether there are any moving objects (e.g., a pedestrian) captured in the fisheye image. Of course, in some embodiments, the in-vehicle computing system 102 may identify multiple objects in the fisheye image in which case the in-vehicle computing system 102 selects one of the identified objects for which to determine the distance from the in-vehicle computing system 102.

In block 506, the in-vehicle computing system 102 determines whether an object has been identified in the captured fisheye image. If not, the method 500 returns to block 502 in which the in-vehicle computing system 102 receives another fisheye image. For example, in some embodiments, the in-vehicle computing system 102 selects a fisheye image captured by one of the other fisheye cameras 126 to determine whether there are any objects within the field of view of that fisheye camera 126. However, if an object has been identified, the in-vehicle computing system 102 determines a contour of the identified object in block 508. As discussed above, in doing so, the in-vehicle computing system 102 may, for example, utilize an edge detection algorithm (e.g., Canny edge detection, Sobel filters, etc.), an image segmentation algorithm (e.g., watershed segmentation, pyramid segmentation, etc.), and/or other image filter/algorithms. Further, depending on the particular embodiment and the algorithms utilized, the in-vehicle computing system 102 may identify an object in the fisheye image and determine the object's contour in the fisheye image contemporaneously.

In block 510, the in-vehicle computing system 102 projects the object's contour onto a particular virtual plane. In doing so, the in-vehicle computing system 102 selects a virtual plane 802 (see FIG. 8) from a plurality of virtual planes 802 to which to project the object's contour in block 512. In the illustrative embodiment, the in-vehicle computing system 102 generates or otherwise determines a set of eight virtual planes 802 (i.e., virtual planes 804, 806, 808, 810, 812, 814, 816, 818) in the arrangement shown in FIG. 8. In particular, in the illustrative embodiment of FIG. 8, the virtual planes 804, 812 are parallel to a side 820 of the vehicle 100. Additionally, the virtual planes 808, 816 are parallel to a rear 822 of the vehicle 100 and orthogonal to the side 820 of the vehicle 100. The virtual planes 806, 814 are parallel to one another and at forty-five degree angles with respect to the virtual planes 804, 808. Further, the virtual planes 810, 818 are parallel to one another, orthogonal to the virtual planes 806, 814, and at forty-five degree angles with respect to the virtual planes 808, 812. Additionally, in the illustrative embodiment, each of the virtual planes 804, 806, 808, 810, 812, 814, 816, 818 is orthogonal to the ground plane (i.e., the plane coincident with the plane on which the vehicle 100 is positioned).

It should be appreciated that, in some embodiments, there may be a different number of virtual planes 802 than in the illustrative embodiment in which there are eight virtual planes 802. Further, in some embodiments, the plurality of virtual planes 802 generated/determined by the in-vehicle computing system 102 includes at least twice as many virtual planes 802 as there are fisheye cameras 126 in the camera system 120 of the vehicle 100. For example, in some embodiments, virtual planes 802 may be positioned orthogonally to the optical axis of each fisheye camera 126, and virtual planes 802 may be positioned "between" the orthogonally-positioned virtual planes 802 at angles. As indicated above, the manner by which the in-vehicle computing system 102 selects the particular virtual plane 802 to which to project the object's contour may vary depending on the particular embodiment. In some embodiments, the in-vehicle computing system 102 selects the virtual plane 802 nearest the identified object (e.g., nearest the projection of the object onto the virtual bowl-shaped projection surface 402). For example, in the illustrative embodiment, if the fisheye image was captured by a front camera 126, the in-vehicle computing system 102 may select one of the virtual planes 806, 808, 810 for projection of the object's contour. In another embodiment, the in-vehicle computing system 102 may determine a line intersecting the fisheye camera 126 (i.e., the camera 126 that captured the fisheye image on which the object's contour has been identified) and an approximate location of the identified object (e.g., on the projection surface 402). In such an embodiment, the in-vehicle computing system 102 may determine the virtual plane 802 that the line intersects (e.g., the virtual plane 802 that the line first intersects from the direction of the camera 126) and project the object's contour onto that virtual plane 802. In other words, the in-vehicle computing system 102 may project the object's contour onto the virtual plane 802 that is in the general direction of the object.

In block 514, the in-vehicle computing system 102 identifies the bottom of the projected object's contour. It should be appreciated that the in-vehicle computing system 102 may utilize any suitable techniques, algorithms, and/or mechanisms for doing so. In the illustrative embodiment, the in-vehicle computing system 102 determines a bounding box 902 for the object's contour 904 on the virtual plane 802 in block 516. As shown in FIG. 9, the bounding box 902 is the smallest rectangular box that bounds the object's contour 904 as projected to the virtual plane 802. Of course, in other embodiments, the bounding box 902 may be otherwise configured to have, for example, a different size, shape, and/or other characteristics. In block 518, the in-vehicle computing system 102 identifies a bottom middle point 906 of the bounding box 902. As indicated above, in some embodiments, the in-vehicle computing system 102 assumes that the identified object is positioned on the ground plane. Accordingly, it should be appreciated that, in some embodiments, the bottom middle point 906 may be treated as a projection to the virtual plane 802 of the point at which the object contacts the ground plane (e.g., a pedestrian's feet).

Referring now to FIG. 6, in block 520, the in-vehicle computing system 102 generates or otherwise determines the imaginary line that passes through (i.e., intersects) both the bottom of the projected object's contour and the fisheye camera 126 that captured the fisheye image from which the object's contour was projected. In particular, in block 522, the in-vehicle computing system 102 determines the line that passes through the bottom middle point 906 and the center of the camera 126 in the illustrative embodiment. In block 524, the in-vehicle computing system 102 determines the intersection point of that determined line and the ground plane.

As indicated above, in some embodiments, the geometry of the camera system 120 and/or other components of the in-vehicle computing system 102 are known or determinable. As such, the in-vehicle computing system 102 may establish a coordinate system and determine the locations of various components of the in-vehicle computing system 102 and/or virtual structural representations (e.g., the virtual planes 802, lines, intersection points, the bottom middle point 906, the ground plane, etc.) within the coordinate system. For example, the ground plane may be defined in the coordinate system by the vectors $\vec{x}_0 = [0\ 0\ 0]^T$, $\vec{x}_1 = [1\ 0\ 0]^T$, and $\vec{x}_2 = [0\ 1\ 0]^T$. Additionally, the bottom of the projected object's contour (e.g., the bottom middle point 906) may be expressed as $[x_b\ y_b\ z_b]^T$, the camera 126 (e.g., the center point) may be expressed as $[x_a\ y_a\ z_a]^T$, and the intersection point of the line with the ground plane may be expressed as $[x_p\ y_p\ z_p]^T$. It should be appreciated that, by virtue of the known geometry and/or the calculations described herein, the coordinate values for the locations of the bottom of the projected object's contour and the camera 126 are known or determinable in the illustrative embodiment. Accordingly, in block 526, the in-vehicle computing system 102 may determine the analytical equations defining the coordinate values of the intersection point according to $$x_p = -\frac{z_b}{z_a - z_b} x_a + \frac{z_a}{z_a - z_b} x_b,\ y_p = -\frac{z_b}{z_a - z_b} y_a + \frac{z_a}{z_a - z_b} y_b,\ \text{and}\ z_p = 0.$$

It should be appreciated that, in some embodiments, the analytical equations may be pre-computed by the in-vehicle computing system 102 or another computing device and stored in the memory 114 and/or the data storage 116 of the in-vehicle computing system 102 for subsequent use. Accordingly, as shown by path 530, the analytical equations may only be computed once in some embodiments and may be utilized repeatedly thereafter (e.g., to evaluate coordinate values for a particular point, for recursive estimation with a filter such as a Kalman filter, and/or for other suitable purposes) without recalculation of the equations themselves.

Figure 7:
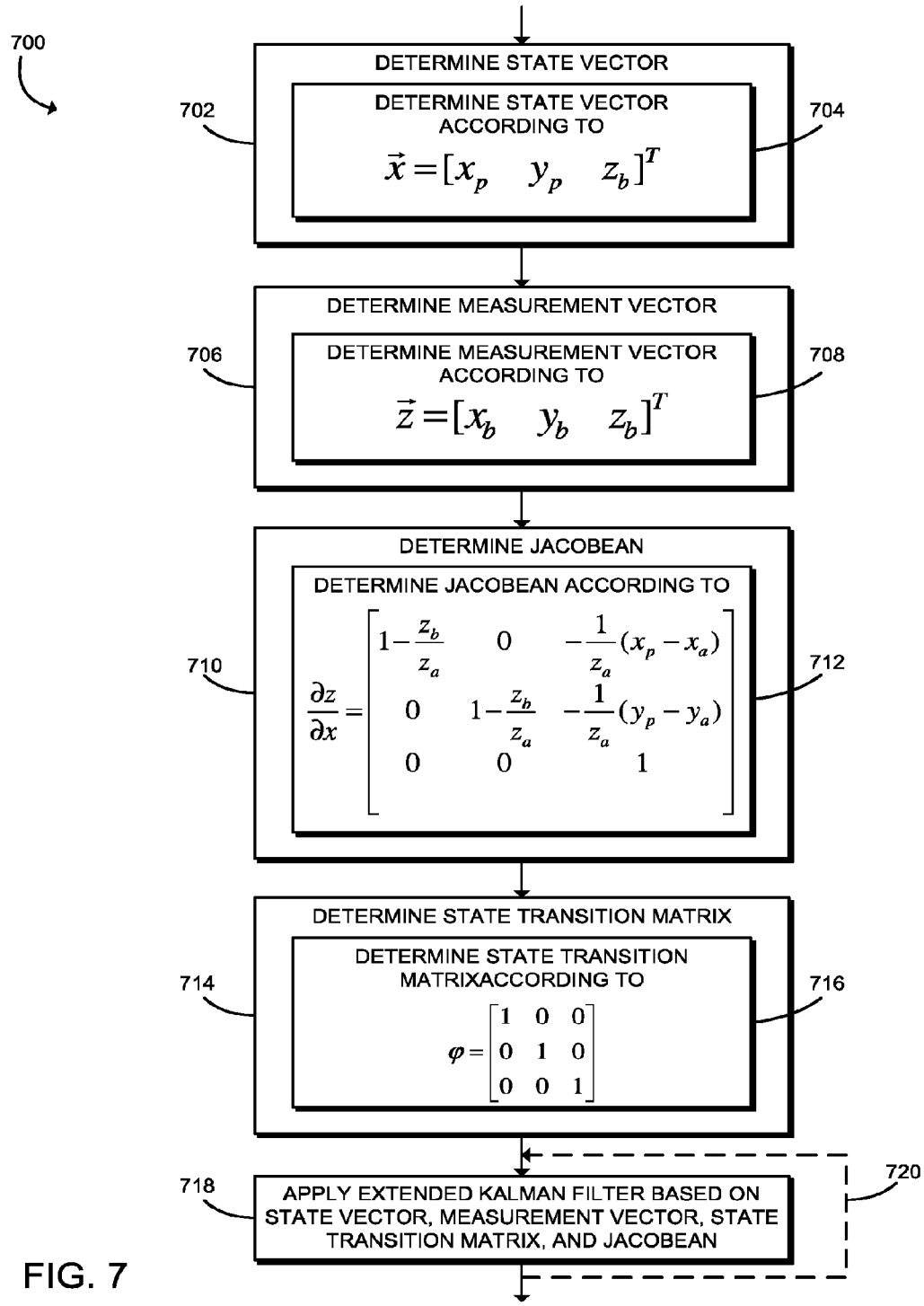
FIG. 7 is a simplified flow diagram of at least one embodiment of a method for determining the location of an object relative to the vehicle by applying a Kalman filter with the in-vehicle computing system of FIG. 1.

In block 528, the in-vehicle computing system 102 determines the location of the object relative to the vehicle 100 based on the determined intersection point and the bottom of the object's contour (e.g., the bottom middle point 906). As indicated above, in some embodiments, the in-vehicle computing system 102 may apply a Kalman filter to determine the location of the object relative to the vehicle 100 (e.g., based on the intersection point and the bottom of the object's contour). To do so, the in-vehicle computing system 102 may execute a method 700 as shown in FIG. 7. The illustrative method 700 begins with block 702 in which the in-vehicle computing system 102 determines a state vector for the Kalman filter. In particular, in block 704, the in-vehicle computing system 102 determines the state vector of the Kalman filter according to $\vec{x} = [x_p\ y_p\ z_b]^T$. In other words, the state vector of the Kalman filter is based on the intersection point described above.

In block 706, the in-vehicle computing system 102 determines a measurement vector for the Kalman filter. In the illustrative embodiment, in block 708, the in-vehicle computing system 102 determines the measurement vector of the Kalman filter according to $\vec{z} = [x_b\ y_b\ z_b]^T$. That is, the measurement vector of the Kalman filter is the point defining the bottom of the object on the virtual plane 802 (e.g., the bottom middle point 906). It should be appreciated that the state and measurement vectors of the illustrative embodiment have the relations $$x_b = x_p - x_p \frac{z_b}{z_a} + x_a \frac{z_b}{z_a}\ \text{and}\ y_b = y_p - y_p \frac{z_b}{z_a} + y_a \frac{z_b}{z_a},$$

which are nonlinear. Accordingly, in the illustrative embodiment, the extended Kalman filter is used rather than the standard linear Kalman filter. Additionally, due to the nonlinearity, a Jacobean is utilized rather than directly using the covariance in the illustrative embodiment. As such, in block 710, the in-vehicle computing system 102 determines a Jacobean for use with the Kalman filter in determining the location of the object. In particular, in block 712, the in-vehicle computing system 102 determines the Jacobean according to $$\frac{\partial z}{\partial x} = \begin{bmatrix} 1 - \frac{z_b}{z_a} & 0 & -\frac{1}{z_a}(x_p - x_a) \\ 0 & 1 - \frac{z_b}{z_a} & -\frac{1}{z_a}(y_p - y_a) \\ 0 & 0 & 1 \end{bmatrix}.$$

In block 714, the in-vehicle computing system 102 determines the state transition matrix for the Kalman filter. It should further be appreciated that, in the illustrative embodiment, there is no a priori knowledge of how the object (e.g., a pedestrian) can move. That is, even assuming the object is a pedestrian, the pedestrian may move in any particular direction at a given point at time. Accordingly, in block 716, the in-vehicle computing system 102 determines the state transition matrix in the illustrative embodiment according to $$\varphi = \begin{bmatrix} 1 & 0 & 0 \\ 0 & 1 & 0 \\ 0 & 0 & 1 \end{bmatrix}$$

in order to represent Brownian motion. In other words, the state transition matrix is a matrix of constant values in the illustrative embodiment. In such embodiments, it should be appreciated that determining the state transition matrix may constitute retrieving the matrix or corresponding data values from the memory 114 and/or the data storage 116 of the in-vehicle computing system 102. Of course, in other embodiments, the state transition matrix may be otherwise determined (e.g., when information regarding the object's movements is known).

In block 718, the in-vehicle computing system 102 applies the extended Kalman filter based on the determined state vector, measurement vector, state transition matrix, and Jacobean to determine the location of the object. As discussed above and illustrated by path 720, in some embodiments, the extended Kalman filter (or another suitable filter) may be applied recursively to estimate the intersection point described above and thereby estimate the location of the object relative to the vehicle 100. Accordingly, the extended Kalman filter may be applied recursively based on the analytical equations determined for the state vector, measurement vector, Jacobean, and/or state transition matrix to generate estimations of the state vector.

Figure 10:
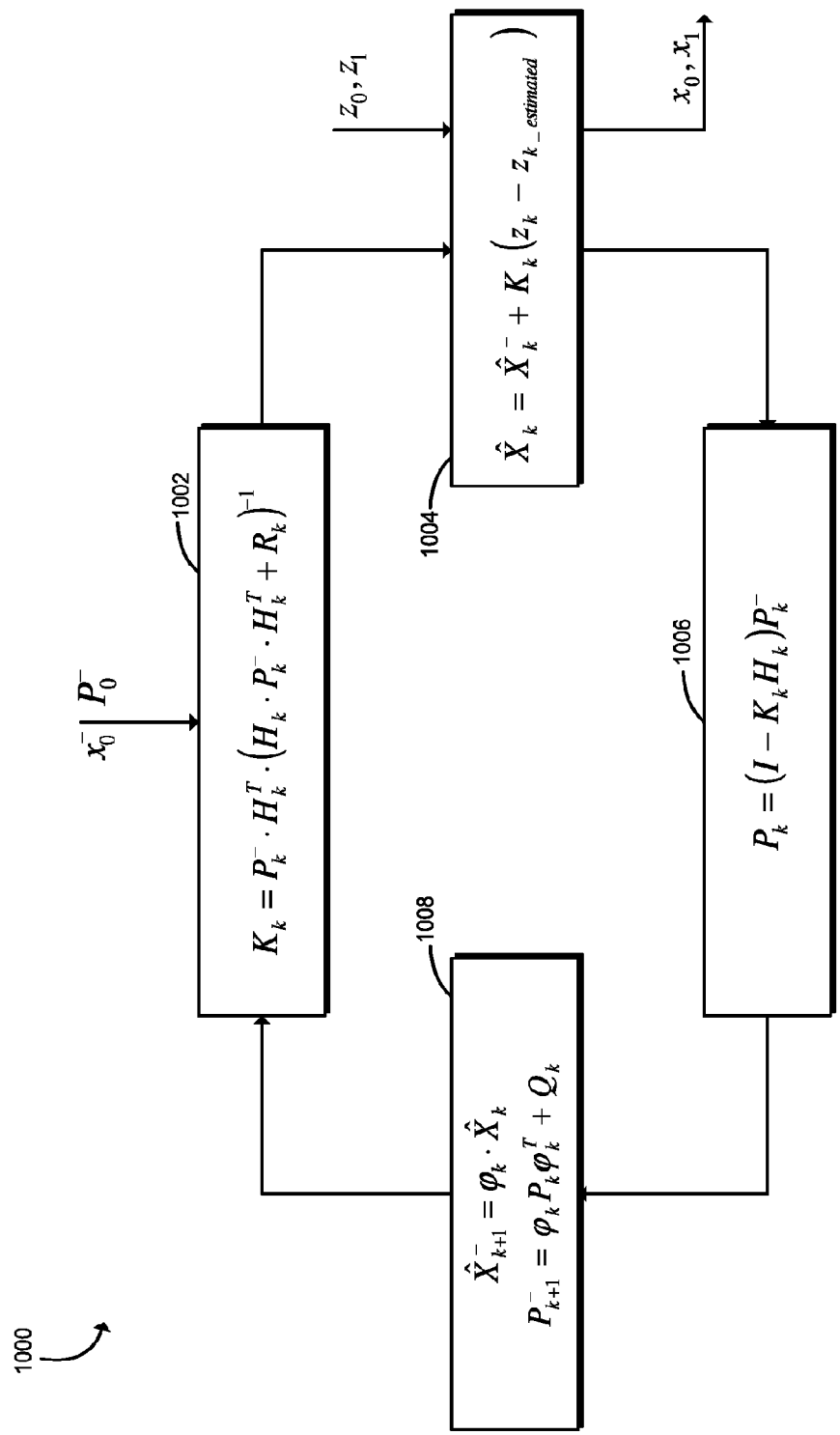
FIG. 10 is a simplified block diagram of at least one embodiment of a Kalman filter.

Referring now to FIG. 10, an illustrative embodiment of a Kalman filter 1000 that may be utilized by the in-vehicle computing system 102 as described herein is shown. It should be appreciated that the illustrative Kalman filter 1000 includes four recursively-applied stages, receives inputs, and generates outputs. In particular, stage 1002 of the Kalman filter 1000 receives one or more prior estimates of the state vector, $x_0^-$, and a corresponding error covariance matrix, $P_0^-$, as inputs and determines the Kalman gain, $K_k$, according to $K_k = P_k^- \cdot H_k^T \cdot (H_k \cdot P_k^- \cdot H_k^T + R_k)^{-1}$. The stage 1004 of the Kalman filter 1000 receives the Kalman gain as an input in addition to the values $z_0$ and $z_1$ of the measurement vector described above, updates an estimate of the state vector, $\hat{X}_k$, with a measurement, $z_k$, according to $\hat{X}_k = \hat{X}_k^- + K_k(z_k - z_{k\_estimated})$, and generates the outputs $x_0$ and $x_1$ of the state vector. In the illustrative embodiment, it should be appreciated that $z_{k\_estimated}$ is determined from the state vector using the analytical equations defining the intersection point described above (see block 526 of FIG. 6). The stage 1006 of the Kalman filter 1000 computes an updated estimate of the error covariance according to $P_k = (I - K_k H_k) P_k^-$. Further, the stage 1008 of the Kalman filter 1000 projects the estimates of the state vector and the error covariance ahead according to $\hat{X}_{k+1}^- = \varphi_k \cdot \hat{X}_k$ and $P_{k+1}^- = \varphi_k P_k \varphi_k^T + Q_k$. As described in the equations of this paragraph, it should be appreciated that x denotes the state vector, z denotes the measurement vector, P denotes the error covariance matrix of the state vector estimates, K denotes the Kalman gain, R denotes the measurement error covariance matrix, Q denotes the process noise covariance matrix, H denotes the Jacobeans described above, φ denotes the state transition matrix, I denotes the identity matrix, k denotes the particular iteration, and the "hat" symbol denotes an estimate.

Figure 11:
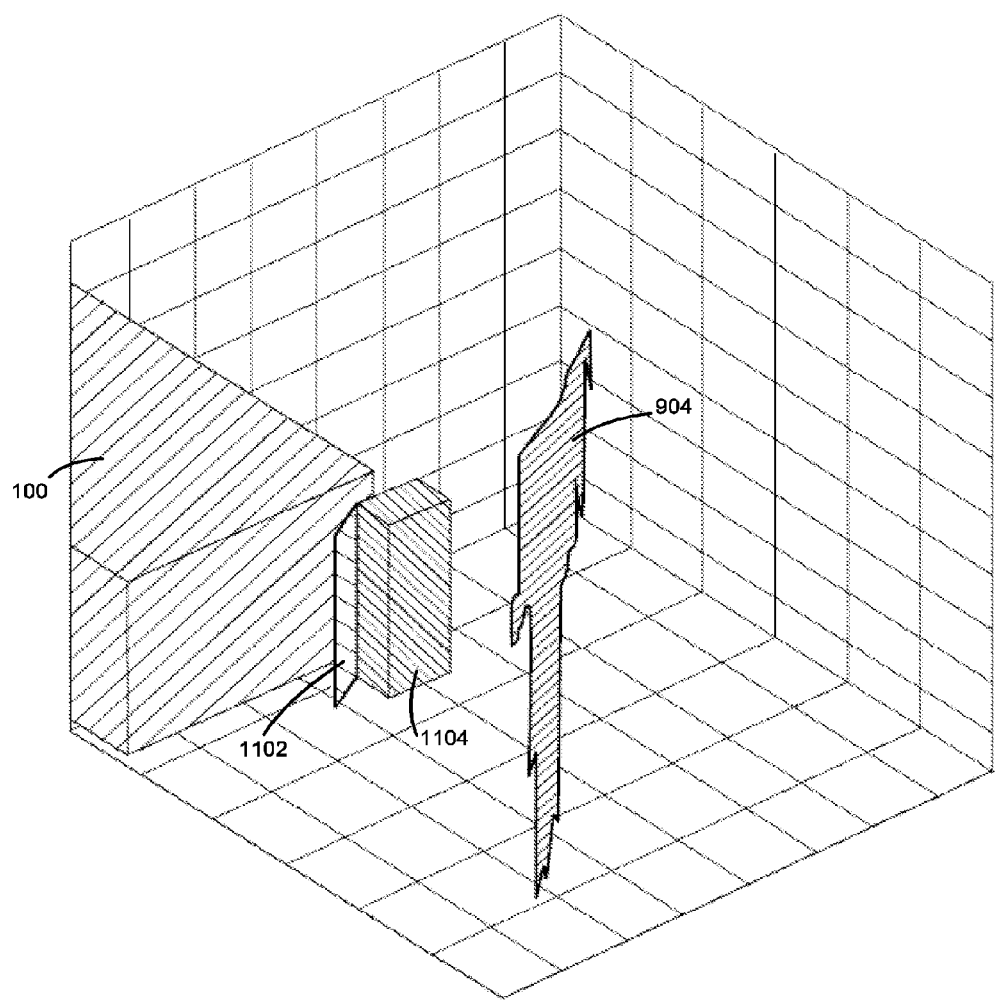
FIG. 11 is a simplified illustration of a determined location of the object relative to the vehicle.

As indicated above, depending on the particular embodiment, the method 500 may be executed by the in-vehicle computing system 102 to determine the location of the identified object with or without the application of the Kalman filter. As shown in FIG. 11, the in-vehicle computing system 102 observes different results for the determined location of the object depending on whether the Kalman filter is applied. In particular, the location 1102 of the object determined without applying with Kalman filter and the location 1104 of the object determined through application of the Kalman filter as described above are shown in FIG. 11. It should be appreciated that the determined location 1104 of the object more accurately estimates the true location of the object than the location 1102. That is, direct estimation results in less consistent and precise results than the techniques described herein involving the application of the Kalman filter.

EXAMPLES

Illustrative examples of the technologies disclosed herein are provided below. An embodiment of the technologies may include any one or more, and any combination of, the examples described below.

Example 1 includes a computing device for determining a distance of an object from a vehicle, the computing device comprising a fisheye camera to capture a fisheye image; an object projection module to (i) identify an object captured in the fisheye image and (ii) project a contour of the identified object on a selected virtual plane that is located outside the vehicle and selected from a predefined set of virtual planes based on a location of the identified object relative to the vehicle; and a location determination module to (i) identify a bottom of the projected contour on the selected virtual plane, (ii) determine an intersection point of an imaginary line with a ground plane coincident with a plane on which the vehicle is positioned, wherein the imaginary line passes through each of the identified bottom of the projected contour and the fisheye camera, and (iii) determine a location of the identified object relative to the vehicle based on the determined intersection point and the identified bottom of the projected contour.

Example 2 includes the subject matter of Example 1, and wherein to determine the location of the identified object relative to the vehicle comprises to apply a Kalman filter based on the determined intersection point and the identified bottom of the projected contour.

Example 3 includes the subject matter of any of Examples 1 and 2, and wherein to apply the Kalman filter comprises to determine a state vector of the Kalman filter according to $\vec{x} = [x_p \ y_p \ z_b]^T$; determine a measurement vector of the Kalman filter according to $\vec{z} = [x_b \ y_b \ z_b]^T$; apply the Kalman filter based on the determined state vector and the determined measurement vector, wherein $x_p$, $y_p$, and $z_p$ are three-dimensional coordinates of the intersection point; and $x_b$, $y_b$, and $z_b$ are three-dimensional coordinates of the bottom of the identified object.

Example 4 includes the subject matter of any of Examples 1-3, and wherein to apply the Kalman filter comprises to determine a Jacobean according to $$\frac{\partial z}{\partial x} = \begin{bmatrix} 1 - \frac{z_b}{z_a} & 0 & -\frac{1}{z_a}(x_p - x_a) \\ 0 & 1 - \frac{z_b}{z_a} & -\frac{1}{z_a}(y_p - y_a) \\ 0 & 0 & 1 \end{bmatrix}$$

and apply an extended Kalman filter based on the determined state vector, the determined measurement vector, and the determined Jacobean, wherein $x_a$, $y_a$, and $z_a$ are three-dimensional coordinates of the fisheye camera.

Example 5 includes the subject matter of any of Examples 1-4, and wherein to project the contour of the identified object comprises to select a virtual plane that is nearest the identified object and on which to project the contour of the identified object.

Example 6 includes the subject matter of any of Examples 1-5, and wherein to project the contour of the identified object comprises to determine a reference line intersecting the fisheye camera and a location of the identified object; and project the contour of the identified object to a virtual plane that the reference line intersects.

Example 7 includes the subject matter of any of Examples 1-6, and wherein to identify the bottom of the projected contour comprises to determine a bounding box of the projected contour on the virtual plane; and identify a middle point of a bottom of the bounding box.

Example 8 includes the subject matter of any of Examples 1-7, and wherein the intersection point is an intersection point of a center of the fisheye camera with the middle point of the bottom of the bounding box.

Example 9 includes the subject matter of any of Examples 1-8, and wherein the bounding box is a smallest rectangular box bounding the projected contour.

Example 10 includes the subject matter of any of Examples 1-9, and wherein to determine the intersection point of the line with the ground plane comprises to determine the intersection point according to $$x_p = -\frac{z_b}{z_a - z_b}x_a + \frac{z_a}{z_a - z_b}x_b, \; y_p = -\frac{z_b}{z_a - z_b}y_a + \frac{z_a}{z_a - z_b}y_b, \text{ and } z_p = 0,$$

wherein $x_p$, $y_p$, and $z_p$ are three-dimensional coordinates of the intersection point; $x_a$, $y_a$, and $z_a$ are three-dimensional coordinates of the fisheye camera; and $x_b$, $y_b$, and $z_b$ are three-dimensional coordinates of the bottom of the identified object.

Example 11 includes the subject matter of any of Examples 1-10, and wherein the predefined set of virtual planes comprises at least twice as many virtual planes as there are fisheye cameras of the vehicle.

Example 12 includes the subject matter of any of Examples 1-11, and wherein each virtual plane of the predefined set of virtual planes is orthogonal to the ground plane.

Example 13 includes the subject matter of any of Examples 1-12, and wherein the predefined set of virtual planes consists of eight virtual planes; a first and second virtual plane of the eight virtual planes are parallel to a side of the vehicle; a third and fourth virtual plane of the eight virtual planes are parallel to a rear of the vehicle and orthogonal to the side of the vehicle; a fifth and sixth virtual plane of the eight virtual planes are parallel to one another and at forty-five degree angles with respect to the first and third virtual planes; a seventh and eighth virtual plane of the eight virtual planes are parallel to one another, orthogonal to the fifth and sixth virtual planes, and at forty-five degree angles with respect to the first and third virtual planes; and each virtual plane of the predefined set of virtual planes is orthogonal to the ground plane.

Example 14 includes the subject matter of any of Examples 1-13, and wherein the object projection module is further to determine the contour of the identified object in the captured fisheye image.

Example 15 includes the subject matter of any of Examples 1-14, and wherein the computing device is embodied as an in-vehicle computing system.

Example 16 includes a method for determining a distance of an object from a vehicle by a computing device of the vehicle, the method comprising identifying, by the computing device, an object captured in a fisheye image generated by a fisheye camera of the vehicle; projecting, by the computing device, a contour of the identified object on a selected virtual plane that is located outside the vehicle and selected from a predefined set of virtual planes based on a location of the identified object relative to the vehicle; identifying, by the computing device, a bottom of the projected contour on the selected virtual plane; determining, by the computing device, an intersection point of an imaginary line with a ground plane coincident with a plane on which the vehicle is positioned, wherein the imaginary line passes through each of the identified bottom of the projected contour and the fisheye camera; and determining, by the computing device, a location of the identified object relative to the vehicle based on the determined intersection point and the identified bottom of the projected contour.

Example 17 includes the subject matter Example 16, and wherein determining the location of the identified object relative to the vehicle comprises applying a Kalman filter based on the determined intersection point and the identified bottom of the projected contour.

Example 18 includes the subject matter of any of Examples 16 and 17, and wherein applying the Kalman filter comprises determining a state vector of the Kalman filter according to $\vec{x} = [x_p \; y_p \; z_b]^T$; determining a measurement vector of the Kalman filter according to $\vec{z} = [x_b \; y_b \; z_b]^T$; applying the Kalman filter based on the determined state vector and the determined measurement vector, wherein $x_p$, $y_p$, and $z_p$ are three-dimensional coordinates of the intersection point; and $x_b$, $y_b$, and $z_b$ are three-dimensional coordinates of the bottom of the identified object.

Example 19 includes the subject matter of any of Examples 16-18, and wherein applying the Kalman filter further comprises determining a Jacobean according to $$\frac{\partial z}{\partial x} = \begin{bmatrix} 1 - \frac{z_b}{z_a} & 0 & -\frac{1}{z_a}(x_p - x_a) \\ 0 & 1 - \frac{z_b}{z_a} & -\frac{1}{z_a}(y_p - y_a) \\ 0 & 0 & 1 \end{bmatrix}$$

and applying an extended Kalman filter based on the determined state vector, the determined measurement vector, and the determined Jacobean, wherein $x_a$, $y_a$, and $z_a$ are three-dimensional coordinates of the fisheye camera.

Example 20 includes the subject matter of any of Examples 16-19, and wherein projecting the contour of the identified object comprises selecting a virtual plane that is nearest the identified object and on which to project the contour of the identified object.

Example 21 includes the subject matter of any of Examples 16-20, and wherein projecting the contour of the identified object comprises determining a reference line intersecting the fisheye camera and a location of the identified object; and projecting the contour of the identified object to a virtual plane that the reference line intersects.

Example 22 includes the subject matter of any of Examples 16-1, and wherein identifying the bottom of the projected contour comprises determining a bounding box of the projected contour on the virtual plane; and identifying a middle point of a bottom of the bounding box.

Example 23 includes the subject matter of any of Examples 16-22, and wherein determining the intersection point of the line with the ground plane comprises determining an intersection point of a center of the fisheye camera with the middle point of the bottom of the bounding box.

Example 24 includes the subject matter of any of Examples 16-23, and wherein the bounding box is a smallest rectangular box bounding the projected contour.

Example 25 includes the subject matter of any of Examples 16-24, and wherein determining the intersection point of the line with the ground plane comprises determining the intersection point according to $$x_p = -\frac{z_b}{z_a - z_b}x_a + \frac{z_a}{z_a - z_b}x_b, \; y_p = -\frac{z_b}{z_a - z_b}y_a + \frac{z_a}{z_a - z_b}y_b, \text{ and } z_p = 0,$$

wherein $x_p$, $y_p$, and $z_p$ are three-dimensional coordinates of the intersection point; $x_a$, $y_a$, and $z_a$ are three-dimensional coordinates of the fisheye camera; and $x_b$, $y_b$, and $z_b$ are three-dimensional coordinates of the bottom of the identified object.

Example 26 includes the subject matter of any of Examples 16-25, and wherein projecting the contour of the identified object to the selected virtual plane comprises selecting the selected virtual plane from a predefined set of virtual planes comprising at least twice as many virtual planes as there are fisheye cameras of the vehicle.

Example 27 includes the subject matter of any of Examples 16-26, and wherein each virtual plane of the predefined set of virtual planes is orthogonal to the ground plane.

Example 28 includes the subject matter of any of Examples 16-27, and wherein projecting the contour of the identified object to the selected virtual plane comprises selecting the selected virtual plane from a predefined set of virtual planes consisting of eight virtual planes; and wherein a first and second virtual plane of the eight virtual planes are parallel to a side of the vehicle; a third and fourth virtual plane of the eight virtual planes are parallel to a rear of the vehicle and orthogonal to the side of the vehicle; a fifth and sixth virtual plane of the eight virtual planes are parallel to one another and at forty-five degree angles with respect to the first and third virtual planes; a seventh and eighth virtual plane of the eight virtual planes are parallel to one another, orthogonal to the fifth and sixth virtual planes, and at forty-five degree angles with respect to the first and third virtual planes; and each virtual plane of the predefined set of virtual planes is orthogonal to the ground plane.

Example 29 includes the subject matter of any of Examples 16-28, and further including determining, by the computing device, the contour of the identified object in the captured fisheye image.

Example 30 includes the subject matter of any of Examples 16-29, and wherein the computing device is embodied as an in-vehicle computing system.

Example 31 includes a computing device comprising a processor; and a memory having stored therein a plurality of instructions that when executed by the processor cause the computing device to perform the method of any of Examples 16-30.

Example 32 includes one or more machine-readable storage media comprising a plurality of instructions stored thereon that, in response to execution by a computing device, cause the computing device to perform the method of any of Examples 16-30.

Example 33 includes a computing device for determining a distance of an object from a vehicle, the computing device comprising means for identifying an object captured in a fisheye image generated by a fisheye camera of the vehicle; means for projecting a contour of the identified object on a selected virtual plane that is located outside the vehicle and selected from a predefined set of virtual planes based on a location of the identified object relative to the vehicle; means for identifying a bottom of the projected contour on the selected virtual plane; means for determining an intersection point of an imaginary line with a ground plane coincident with a plane on which the vehicle is positioned, wherein the imaginary line passes through each of the identified bottom of the projected contour and the fisheye camera; and means for determining a location of the identified object relative to the vehicle based on the determined intersection point and the identified bottom of the projected contour.

Example 34 includes the subject matter of Example 33, and wherein the means for determining the location of the identified object relative to the vehicle comprises means for applying a Kalman filter based on the determined intersection point and the identified bottom of the projected contour.

Example 35 includes the subject matter of any of Examples 33 and 34, and wherein the means for applying the Kalman filter comprises means for determining a state vector of the Kalman filter according to $\vec{x}=[x_p \; y_p \; z_b]^T$; means for determining a measurement vector of the Kalman filter according to $\vec{z}=[x_b \; y_b \; z_b]^T$; means for applying the Kalman filter based on the determined state vector and the determined measurement vector, wherein $x_p$, $y_p$, and $z_p$ are three-dimensional coordinates of the intersection point; and $x_b$, $y_b$, and $z_b$ are three-dimensional coordinates of the bottom of the identified object.

Example 36 includes the subject matter of any of Examples 33-35, and wherein the means for applying the Kalman filter further comprises means for determining a Jacobean according to $$\frac{\partial z}{\partial x} = \begin{bmatrix} 1-\frac{z_b}{z_a} & 0 & -\frac{1}{z_a}(x_p - x_a) \\ 0 & 1-\frac{z_b}{z_a} & -\frac{1}{z_a}(y_p - y_a) \\ 0 & 0 & 1 \end{bmatrix}$$

and means for applying an extended Kalman filter based on the determined state vector, the determined measurement vector, and the determined Jacobean, wherein $x_a$, $y_a$, and $z_a$ are three-dimensional coordinates of the fisheye camera.

Example 37 includes the subject matter of any of Examples 33-36, and wherein the means for projecting the contour of the identified object comprises means for selecting a virtual plane that is nearest the identified object and on which to project the contour of the identified object.

Example 38 includes the subject matter of any of Examples 33-37, and wherein the means for projecting the contour of the identified object comprises means for determining a reference line intersecting the fisheye camera and a location of the identified object; and means for projecting the contour of the identified object to a virtual plane that the reference line intersects.

Example 39 includes the subject matter of any of Examples 33-38, and wherein the means for identifying the bottom of the projected contour comprises means for determining a bounding box of the projected contour on the virtual plane; and means for identifying a middle point of a bottom of the bounding box.

Example 40 includes the subject matter of any of Examples 33-39, and wherein the means for determining the intersection point of the line with the ground plane comprises means for determining an intersection point of a center of the fisheye camera with the middle point of the bottom of the bounding box.

Example 41 includes the subject matter of any of Examples 33-40, and wherein the bounding box is a smallest rectangular box bounding the projected contour.

Example 42 the subject matter of any of Examples 33-41, and wherein the means for determining the intersection point of the line with the ground plane comprises means for determining the intersection point according to $$x_p = -\frac{z_b}{z_a - z_b}x_a + \frac{z_a}{z_a - z_b}x_b, \ y_p = -\frac{z_b}{z_a - z_b}y_a + \frac{z_a}{z_a - z_b}y_b, \text{ and } z_p = 0,$$

wherein $x_p$, $y_p$, and $z_p$ are three-dimensional coordinates of the intersection point; $x_a$, $y_a$, and $z_a$ are three-dimensional coordinates of the fisheye camera; and $x_b$, $y_b$, and $z_b$ are three-dimensional coordinates of the bottom of the identified object.

Example 43 includes the subject matter of any of Examples 33-42, and wherein the means for projecting the contour of the identified object to the selected virtual plane comprises means for selecting the selected virtual plane from a predefined set of virtual planes comprising at least twice as many virtual planes as there are fisheye cameras of the vehicle.

Example 44 includes the subject matter of any of Examples 33-43, and wherein each virtual plane of the predefined set of virtual planes is orthogonal to the ground plane.

Example 45 includes the subject matter of any of Examples 33-44, and wherein the means for projecting the contour of the identified object to the selected virtual plane comprises means for selecting the selected virtual plane from a predefined set of virtual planes consisting of eight virtual planes; and wherein a first and second virtual plane of the eight virtual planes are parallel to a side of the vehicle; a third and fourth virtual plane of the eight virtual planes are parallel to a rear of the vehicle and orthogonal to the side of the vehicle; a fifth and sixth virtual plane of the eight virtual planes are parallel to one another and at forty-five degree angles with respect to the first and third virtual planes; a seventh and eighth virtual plane of the eight virtual planes are parallel to one another, orthogonal to the fifth and sixth virtual planes, and at forty-five degree angles with respect to the first and third virtual planes; and each virtual plane of the predefined set of virtual planes is orthogonal to the ground plane.

Example 46 includes the subject matter of any of Examples 33-45, and further comprising means for determining the contour of the identified object in the captured fisheye image.

Example 47 includes the subject matter of any of Examples 33-46, and wherein the computing device is embodied as an in-vehicle computing system.

The invention claimed is:

1. A computing device for determining a distance of an object from a vehicle, the computing device comprising:
   a fisheye camera to capture a fisheye image;
   an object projection module to project a contour of an object identified in the fisheye image onto a selected virtual plane that is located outside the vehicle and selected from a predefined set of virtual planes based on a location of the identified object relative to the vehicle, wherein to project the contour of the identified object comprises to select a virtual plane of the predefined set of virtual planes that is nearest to the identified object and on which to project the contour of the identified object; and
   a location determination module to determine a location of the identified object relative to the vehicle based on a bottom of the projected contour.

2. The computing device of claim 1, wherein to project the contour of the identified object comprises to:
   determine a reference line intersecting the fisheye camera and a location of the identified object; and
   project the contour of the identified object to a virtual plane that the reference line intersects.

3. The computing device of claim 1, wherein to determine the location of the identified object relative to the vehicle comprises to (i) determine an intersection point of an imaginary line with a ground plane coincident with a plane on which the vehicle is positioned, wherein the imaginary line passes through each of the identified bottom of the projected contour and the fisheye camera, and (ii) determine the location of the identified object relative to the vehicle based on the determined intersection point and the bottom of the projected contour.

4. The computing device of claim 3, wherein to determine the location of the identified object relative to the vehicle comprises to apply a Kalman filter based on the determined intersection point and the bottom of the projected contour.

5. The computing device of claim 3, wherein the location determination module is further to
   determine a bounding box of the projected contour on the virtual plane; and
   identify a middle point of a bottom of the bounding box to identify the bottom of the projected contour.

6. The computing device of claim 5, wherein the intersection point is an intersection point of a center of the fisheye camera with the middle point of the bottom of the bounding box.

7. The computing device of claim 1, wherein each virtual plane of the predefined set of virtual planes is orthogonal to the ground plane.

8. One or more non-transitory machine-readable storage media comprising a plurality of instructions stored thereon that, when executed a computing device, cause the computing device to:
- capture a fisheye image;
- project a contour of an object identified in the fisheye image onto a selected virtual plane that is located outside a vehicle and selected from a predefined set of virtual planes based on a location of the identified object relative to the vehicle, wherein to project the contour of the identified object comprises to select a virtual plane of the predefined set of virtual planes that is nearest to the identified object and on which to project the contour of the identified object; and
- determine a location of the identified object relative to the vehicle based on a bottom of the projected contour.

9. The one or more non-transitory machine-readable storage media of claim 8, wherein to project the contour of the identified object comprises to:
- determine a reference line intersecting the fisheye camera and a location of the identified object; and
- project the contour of the identified object to a virtual plane that the reference line intersects.

10. The one or more non-transitory machine-readable storage media of claim 8, wherein to determine the location of the identified object relative to the vehicle comprises to (i) determine an intersection point of an imaginary line with a ground plane coincident with a plane on which the vehicle is positioned, wherein the imaginary line passes through each of the identified bottom of the projected contour and the fisheye camera, and (ii) determine the location of the identified object relative to the vehicle based on the determined intersection point and the bottom of the projected contour.

11. The one or more non-transitory machine-readable storage media of claim 10, wherein the plurality of instructions, when executed, further cause the computing device to:
- determine a bounding box of the projected contour on the virtual plane; and
- identify a middle point of a bottom of the bounding box to identify the bottom of the projected contour.

12. The one or more non-transitory machine-readable storage media of claim 8, wherein each virtual plane of the predefined set of virtual planes is orthogonal to the ground plane.

13. A method for determining a distance of an object from a vehicle by a computing device of the vehicle, the method comprising:
- capturing a fisheye image;
- projecting a contour of an object identified in the fisheye image onto a selected virtual plane that is located outside the vehicle and selected from a predefined set of virtual planes based on a location of the identified object relative to the vehicle, wherein projecting the contour of the identified object comprises selecting a virtual plane of the predefined set of virtual planes that is nearest to the identified object and on which to project the contour of the identified object; and
- determining a location of the identified object relative to the vehicle based on a bottom of the projected contour.

14. The method of claim 13, wherein projecting the contour of the identified object comprises:
- determining a reference line intersecting the fisheye camera and a location of the identified object; and
- projecting the contour of the identified object to a virtual plane that the reference line intersects.

15. The method of claim 13, wherein determining the location of the identified object relative to the vehicle comprises (i) determining an intersection point of an imaginary line with a ground plane coincident with a plane on which the vehicle is positioned, wherein the imaginary line passes through each of the identified bottom of the projected contour and the fisheye camera, and (ii) determining the location of the identified object relative to the vehicle based on the determined intersection point and the bottom of the projected contour.

16. The method of claim 15, further comprising:
- determining a bounding box of the projected contour on the virtual plane; and
- identifying a middle point of a bottom of the bounding box to identify the bottom of the projected contour.

17. The method media of claim 13, wherein each virtual plane of the predefined set of virtual planes is orthogonal to the ground plane.

* * * * *